(12) United States Patent
Beerends

(10) Patent No.: US 8,014,999 B2
(45) Date of Patent: Sep. 6, 2011

(54) FREQUENCY COMPENSATION FOR PERCEPTUAL SPEECH ANALYSIS

(75) Inventor: John Gerard Beerends, Hengstdijk (NL)

(73) Assignee: Nederlandse Organisatie voor toegepast - natuurwetenschappelijk Onderzoek TNO, Delft (NL)

( * ) Notice: Subject to any disclaimer, the term of this patent is extended or adjusted under 35 U.S.C. 154(b) by 1044 days.

(21) Appl. No.: 11/663,138

(22) PCT Filed: Sep. 20, 2005

(86) PCT No.: PCT/NL2005/000683
§ 371 (c)(1),
(2), (4) Date: May 17, 2007

(87) PCT Pub. No.: WO2006/033570
PCT Pub. Date: Mar. 30, 2006

(65) Prior Publication Data
US 2008/0040102 A1 Feb. 14, 2008

(30) Foreign Application Priority Data
Sep. 20, 2004 (EP) .................................... 04077601

(51) Int. Cl.
*G10L 11/04* (2006.01)

(52) U.S. Cl. ..... 704/207; 704/229; 704/230; 704/200.1; 704/240; 381/57; 381/17; 381/86; 381/106

(58) Field of Classification Search .................. 704/230, 704/200.1, 500–504, 226–229, 240, 207; 381/57, 17, 106, 86
See application file for complete search history.

(56) References Cited

U.S. PATENT DOCUMENTS 4,947,133 A * 8/1990 Thomas ........................ 327/318
(Continued)

FOREIGN PATENT DOCUMENTS

EP 1 241 663 A1 9/2002
(Continued)

OTHER PUBLICATIONS

"Perceptual evaluation of speech quality (PESQ): An objective method for end-to-end speech quality assessment of narrow-band telephone networks and speech codecs", ITU-T Recommendation p. 862, XP-002327961 Feb. 23, 2001, pp. 1-21.

*Primary Examiner* — Vijay B Chawan
(74) *Attorney, Agent, or Firm* — Michaelson & Associates; Peter L. Michaelson; Brian K. Johnson

(57) ABSTRACT

The invention provides a softscaled frequency compensation function that allows the evaluation of a first quality measure indicating a global impact of all distortions in an audio transmission system, including linear frequency response distortions and second quality measure that only lakes into account the impact of linear frequency response distortions. The softscaled frequency compensation function is derived from a softscaled ratio between a time integrated output and a time integrated input power density functions. The first quality measure is derived from the difference loudness density function as function of time and frequency, using the frequency compensated input loudness density function and the gain compensated output loudness density function both as a function of time and frequency, in the same manner as carried out in ITU standard P.862. The second measure is established from a difference loudness density function as function of frequency only that is derived from a time integration of a second frequency compensated input loudness density function and the gain compensated output loudness density function both as a function of time and frequency.

14 Claims, 3 Drawing Sheets

U.S. PATENT DOCUMENTS

| | | | | |
|---|---|---|---|---|
| 5,321,636 A * | 6/1994 | Beerends | .................... | 702/76 |
| 5,588,089 A * | 12/1996 | Beerends et al. | ............. | 704/205 |
| 5,632,003 A * | 5/1997 | Davidson et al. | .......... | 704/200.1 |
| 5,687,281 A * | 11/1997 | Beerends et al. | ............. | 704/203 |
| 5,878,388 A * | 3/1999 | Nishiguchi et al. | ........... | 704/214 |
| 6,018,706 A * | 1/2000 | Huang et al. | .................. | 704/207 |
| 6,041,294 A * | 3/2000 | Beerends | .................... | 704/203 |
| 6,064,966 A * | 5/2000 | Beerends | .................... | 704/500 |
| 6,594,307 B1 * | 7/2003 | Beerends | .................... | 375/224 |
| 7,013,266 B1 * | 3/2006 | Berger | ......................... | 704/203 |
| 7,313,517 B2 * | 12/2007 | Beerends et al. | ............. | 704/200 |
| 7,315,812 B2 * | 1/2008 | Beerends | .................... | 704/200.1 |
| 7,366,663 B2 * | 4/2008 | Beerends et al. | ............. | 704/231 |
| 7,457,757 B1 * | 11/2008 | McNeill et al. | ............... | 704/500 |
| 7,478,045 B2 * | 1/2009 | Allamanche et al. | ......... | 704/236 |
| 7,526,093 B2 * | 4/2009 | Devantier et al. | ............... | 381/59 |
| 7,548,855 B2 * | 6/2009 | Chen et al. | ................... | 704/230 |
| 7,624,008 B2 * | 11/2009 | Beerends et al. | ............. | 704/225 |
| 7,689,406 B2 * | 3/2010 | Beerends | ........................ | 704/3 |

FOREIGN PATENT DOCUMENTS

WO      WO 03/076889 A1      9/2003

* cited by examiner

US 8,014,999 B2

FREQUENCY COMPENSATION FOR PERCEPTUAL SPEECH ANALYSIS

FIELD OF THE INVENTION

The invention relates to a method for establishing a frequency compensated input pitch power density function of a time framed input signal for application to an audio transmission system having an input and an output, and the output of which yields a time framed output signal.

The invention also relates to a processing system for establishing a frequency compensated input pitch power density function.

The invention also relates to a computer readable medium comprising computer executable software code.

BACKGROUND

The method and system to which the invention relates, may be used for example as part of a method or system for analysing the perceived quality of an audio transmission system. Such method and system for analysing a perceptual quality measure for the impact of linear frequency distortion are known from a previously published European patent application no EP1343145 and are also disclosed in references [1] . . . [8]. The disclosed system and method and its predecessors provide for perceptual speech evaluation as part of ITU-T recommendation P.862 (further referred to as P.862), whereby a single overall measure for the perceived quality of a degraded output signal with respect to an input signal is obtained.

The disclosed method and system are based on the insight that speech and audio quality measurement should be carried out in the perceptual domain (see FIG. 1). This goal is achieved by comparing a reference speech signal $X_n$, that is applied to the system under test (1), with its degraded output signal $Y_n$. By establishing the internal perceptual representations of these signals (0.1), (0.2) and comparing (0.3) them, an estimate can be made about the perceived quality by mapping (0.4) the result to a perceived quality scale, yielding a perceived quality measure PESQ. A perceived quality scale, also known as a mean opinion scale (MOS) is established in the prior art by empirical estimation. Persons are asked to judge the quality of degraded or distorted speech fragments. The scores are then matched to the actual distortion and laid down in a perceptual scale. This scale can be used to predict the perceptual score depending on the distortion present in a signal.

Currently available processing systems for determining perceived quality of an audio transmission system, including P.862, suffer from the fact that a single number is outputted that represents the overall quality. This makes it impossible to find underlying causes for the perceived degradations. Classical measurements like signal to noise ratio, frequency response distortion, total harmonic distortion, etc. pre-suppose a certain type of degradation and then quantify this by performing a certain type of quality measurement. This classical approach finds one or more underlying causes for bad performance of the system under test but is not able to quantify the impact of the linear frequency response distortion in relation to the other types of distortion with regard to the overall perceived quality.

Furthermore, the performance of currently available methods and processing systems for determining perceived quality of an audio transmission system, including P.862, give inadequate results, since the perceived linear frequency distortion is not treated properly in those systems.

The above methods utilise frequency compensation of an input power density function, derived from the input signal, for the purpose of quantifying the effect that linear frequency response distortions have less impact on the perceived speech quality than non-linear distortions.

The known method of frequency compensation fails because they either use a hard clipping function or a modified clipping function that do not allow to quantify the impact of linear frequency response distortions on the perceived speech quality in a perceptual correct manner.

SUMMARY OF THE INVENTION

It is an object of the invention to provide a method and a system for frequency compensation of input pitch power density functions that allows to quantify the impact of linear frequency response distortions on the perceived speech quality in a perceptual correct manner.

The object of the invention can be achieved in a first aspect of the invention, by a method for frequency compensating an input pitch power density function of an audio transmission system having an input and an output, and to which input a time framed input signal is applied and the output of which yields a time framed output signal, wherein the method may comprise the steps of:
  processing the input signal, to obtain an input pitch power density function;
  processing the output signal, to obtain an output pitch power density function;
  frequency compensating the input pitch-power density function, with a first frequency compensating function, to obtain a first frequency compensated input pitch power density function;
  the step of frequency compensating the input pitch power density function comprising a softscaling function using power compression function in the range of 0.5, and an offset in the range of $4*10^5$.

Pitch power density functions and soft-scaling per se are known from the prior art. With this compression function the overall impact of linear frequency response distortions can be quantified to obtain a global score for the overall quality that includes the correct quantification of the linear frequency response distortions This single quality number may be calculated for example in the same manner as carried out in P.862 [3], i.e. for each time frame two different disturbances are calculated from a frequency integration of the loudness difference function. The final quality number is then derived from two different time integrations. The improvement provides a better correlation between objective speech quality measurements and subjective speech quality assessments, especially for speech transmission systems where linear frequency response distortions dominate the overall speech quality (e.g. systems that only carry out a bandwidth limitation).

Based on this improved method according to the invention, embodiments can provide for a method or system for determining the perceived quality of an audio transmission system, which give accurate results w.r.t. linear frequency distortion like P.862 and for a method or system that allow to obtain a single output value that is representative for the perceived distortion including linear frequency distortions.

In another embodiment according to the first aspect of the invention, further comprising the steps of:
  compensating the output pitch power density function for short term gain variations, to obtain a locally scaled output pitch power density function;

transforming the frequency compensated output pitch
power density function to a loudness perception scale to
obtain an output loudness density function;
frequency compensating the input pitch power density
function, with a second frequency compensating function, yielding a second frequency compensated input
pitch power density function based on a softscaling
power function with a power in the range 0.4, and an
offset in the range of $5*10^6$
transforming the second frequency compensated input
pitch power density function to a loudness perception
scale to obtain an input loudness density function;
averaging over the time frames of the framed input loudness density function to obtain an averaged input loudness spectrum;
averaging over the time frames of the framed output loudness density function to obtain an averaged output loudness spectrum;
normalizing the averaged output loudness spectrum with
respect to the averaged input loudness spectrum, thereby
obtaining a normalized averaged output loudness spectrum;
subtracting the input loudness spectrum from the normalized output loudness spectrum thereby obtaining a difference averaged loudness spectrum;
Lebesque integrating the difference averaged loudness
spectrum function, thereby establishing a linear spectral
distortion measure for the audio transmission system;
allows for the establishment of a single measure indicating
the perceived linear frequency distortion.

The method as such obtains a single quality measure for the
linear frequency distortion, based upon the difference in the
loudness spectrum. This measure however still requires mapping to a perceptual quality measure, which is achieved in the
following embodiment according to the first aspect of the
invention, further comprising the steps
    establishing a roughness measure of the difference averaged loudness spectrum based on the absolute difference
        of consecutive frequency bin values
    combining the roughness measure and the linear spectral
        distortion measure by multiplication and mapping the
        result to a MOS scale, thereby obtaining a frequency
        response impact quality measure Another embodiment according to the first aspect of the
invention, wherein the step of processing the time framed
input signal further comprises frequency compensating an
input pitch power density function with respect to an ideal
spectrum, has the advantage that it compensates errors in the
recording technique which often lead to unbalanced spectral
power densities, in most cases an over emphasis of the lower
frequencies (below 500 Hz). This step is applied on the input
pitch power densities as obtained by Hanning windowing,
FFT and frequency warping of the input signal according to
reference [1].

In another embodiment according to the first aspect of the
invention, the first frequency compensation functions is
expressed in terms of Bark bin values and is derived from
averaging over at least two neighboring Bark bin values of the
input and output pitch power density functions In another embodiment according to the first aspect of the
invention, the second frequency compensation functions is
also expressed in terms of Bark bin values and is derived from
averaging over at least two neighboring Bark bin values of the
input and output pitch power density functions.

The averaging in the frequency compensation function
calculation smoothes local peaks in the frequency compensation function which are less audible than would have been
predicted from a direct calculation, without the smoothing.

Another embodiment according to the first aspect of the
invention, further comprising the steps of
    detecting time frames for which simultaneously the input
        and output pitch power density functions per frame are
        larger then a silence criterion value;
    gating the input loudness density function frames and output loudness density function frames under the control
        of the detecting of time frames,
    prevents instability in the results due to values in the range
        of 0, especially in frames where division by zero may
        occur.

A further embodiment according to the first aspect of the
invention, wherein the step of establishing of a linear spectral
distortion measure further comprises
    splitting the difference averaged loudness spectrum in a
        positive difference averaged loudness spectrum and a
        negative difference averaged loudness spectrum;
    integrating in the frequency domain positive values of the
        difference averaged loudness spectrum, thereby establishing a positive linear spectral distortion measure;
    integrating in the frequency domain negative values of the
        difference averaged loudness spectrum, thereby establishing a negative linear spectral distortion measure;
    multiplying the roughness measure and the positive linear
        spectral distortion measure and mapping the result to a
        MOS (Mean Opinion Score) scale, thereby obtaining a
        positive frequency response distortion quality measure;
    combining the roughness measure and the negative linear
        spectral distortion measure by multiplication and mapping the result to a MOS (Mean Opinion Score) scale,
        thereby obtaining a negative frequency response distortion quality measure,
    weighing the positive frequency response distortion quality measure with a first weigh factor greater than 0,
    weighing the negative frequency response distortion quality measure with a second weigh factor greater than 0;
    adding the weighed negative frequency response impact
        quality measure and the positive frequency response
        impact quality measure thereby obtaining a single frequency response impact measure,
allows for fine tuning and optimizing the method for frequency bands that appear louder in the output signal and for
frequency bands that appear softer in the output signal. Which
frequency bands fall into the positive or negative parts of the
averaged difference loudness spectrum can be controlled in
the step of frequency compensating the input pitch power
density function by adjusting the compensation factors in that
step. These compensation factors are adjusted for optimal
correlation between the outcome of the frequency response
impact measure and subjective perception.

Another embodiment according to first aspect of the invention, further comprising the steps of
    compensating the output pitch power density function for
        short term gain variations, to obtain a locally scaled
        output pitch power density function;
    transforming the first frequency compensated input pitch
        power density function to a loudness perception scale to
        obtain an input loudness density function;
    transforming the frequency compensated output pitch
        power density function to a loudness perception scale to
        obtain an output loudness density function;
    subtracting output and input loudness density functions to
        obtain an difference loudness density function;

asymmetrical processing between positive and negative bins in the difference loudness density function, thereby obtaining an asymmetrical difference loudness density function;

frequency integrating of the asymmetrical difference loudness density function, and emphasizing silent parts thereby obtaining an asymmetrical disturbance measure;

frequency integrating of the difference loudness density function, and emphasizing silent parts thereby obtaining an symmetrical disturbance measure;

time integrating the difference loudness density function and the asymmetrical difference loudness density function, thus obtaining a symmetrical and a asymmetrical disturbance measure and then combining the symmetrical and asymmetrical disturbance measures, thereby obtaining a single perceptive quality estimate, allows for determining the perceived quality of an audio transmission system, which gives accurate results w.r.t. linear frequency distortion.

The object of the invention is further achieved in a second aspect according to the invention by a processing system for measuring the transmission quality of an audio transmission system, comprising:

a processor, means for inputting a framed input signal and a framed output signal, whereby the processor is arranged for executing the steps of the method according to the first aspect of the invention.

The object of the invention is further achieved in a third aspect according to the invention by a software program storage means comprising computer executable software code, which when loaded on a computer system, enables the computer system to execute the steps of the method according to the first aspect of the invention.

DETAILED DESCRIPTION

Figure 1:
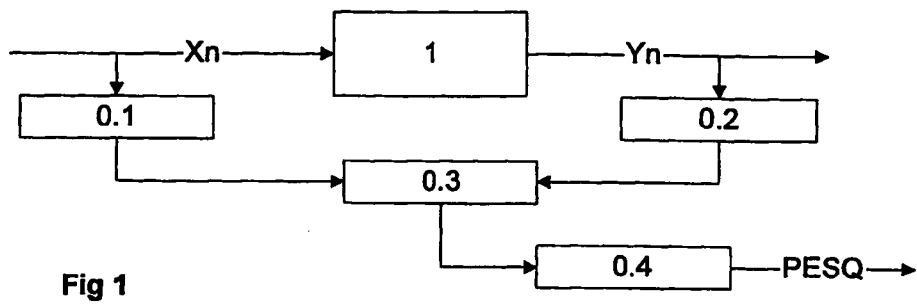
FIG. 1 shows a general diagram of a method for determining the perceived quality of an audio transmission system according to the state of the art.
Figure 2:
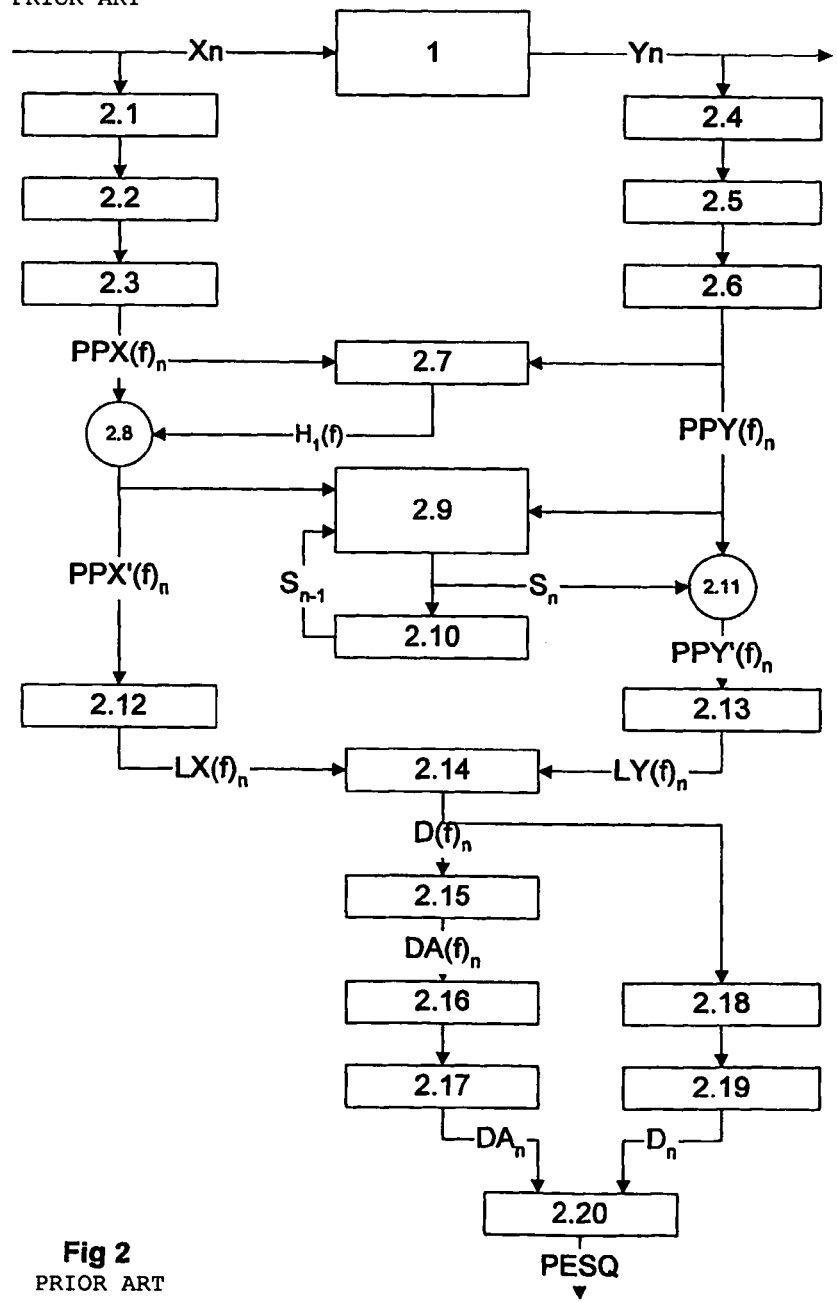
FIG. 2 shows a diagram representing a method for determining the perceived quality of an audio transmission system according to ITU-T recommendation P.862 according to the state of the art.

FIG. 2 discloses a diagram representing a method for determining the perceived quality of an audio transmission system according to ITU-T recommendation P.862, reference [6], which is hereby included by reference.

This diagram is explained briefly since steps 2.1 ... 2.12 are also used in the system and method according to the invention.

Step 1 represents the conversion of an input signal $X_n$ to an output signal $Y_n$ by a system or a device under test 1, whereby the in- and output signals are represented by discrete time frames 1 ... n, wherein $X_n$ represents a reference signal and $Y_n$ represents the distorted response of the system under test 1 on $X_n$. The frames may be 32 ms of duration, according to current PESQ embodiments. For the invention the frame duration may either be less than 32 ms or much longer. Durations covering a complete speech fragment, in the order of minutes, may also be feasible.

The device or system under test may be a telecom network, a telecom terminal, e.g. a telephone, or any device or system for processing audio. The input signal may be a speech fragment, but application of the embodiments of the invention are not limited to speech.

In order to establish a perceived quality measure for the output signal $Y_n$ with respect to the input signal $X_n$ some preprocessing is necessary. According to the state of the art this is performed by the steps 2.1 ... 2.6.

Step 2.1 and 2.4 represent the time windowing of the input signal $X_n$ frames and output signal $Y_n$ frames respectively, using a Handing window.

Steps 2.2 and 2.5 represent the discrete Fourier transforming frame by frame of the input and output signals respectively.

Steps 2.3 and 2.6 represent the warping of the Fourier transformed in- and output signal into so-called Bark bands, thus obtaining the pitch power density functions in discrete frequency bands for the input signal and for the output signal, $PPX(f)_n$ and $PPY(f)_n$ respectively.

Step 2.7 represents calculating a linear frequency compensation, which is used to weigh in step 2.8 the input pitch power density function $PPX(f)_n$ to obtain a frequency compensated input pitch power density function $PPX'(f)_n$. The input pitch power density function $PPX(f)_n$ is to be frequency compensated for the filtering that takes place in the audio transmission system under test 1. In P862, the amount of compensation determines the contribution of linear frequency distortion in the ultimate PESQ value.

The frequency compensation as disclosed in the state of the art, i.e. P.862, uses an estimation of the linear frequency response of the system under test based on all frames for which the input reference signal is larger then a silence criterion value (speech active frames, $PPX(P)_n > 10^7$, frames louder then about 70 dB SPL for P.862 when used with play back levels that are correctly set). The frequency response compensation in P.862 is carried out on the input pitch power density function $PPX(f)_n$ per frame.

All power density functions and offsets in this description are scaled towards a ITU P.862 standard for power functions.

In 2.7 a frequency response compensation function H(f) is calculated by averaging $PPX(f)_n$ and $PPY(f)_n$, the outputs of 2.3 and 2.6 respectively, over time index n (plain power averaging) resulting in averaged pitch power density functions APPX and APPY (used in 2.7) from which a first frequency compensated function $PPX'(f)_n$ at the output of 2.8 is calculated by multiplication. The aim is to fully compensate for small, inaudible frequency response distortions, i.e. all deviations less than a prefixed amount of decibels are fully compensated.

Step 2.9 represents calculating a local scaling function for compensating the output pitch power density function short-term gain variations, whereby the last local scaling function $S_{n-1}$ is stored in 2.10 for use in the next frame. The compensation is effected by multiplying in 2.11 the local scaling function $S_n$ with the output pitch power density function $PPY(f)_n$, resulting in a locally scaled output pitch power density function $PPY(f)_n$.

The input and output pitch power density functions $PPX'(f)_n$ and $PPY'(f)_n$ are transformed to a loudness scale in steps 2.12 and 2.13 in accordance with the Sone loudness scale using Zwicker's algorithm, resulting in input and output loudness density functions $LX(f)_n$ and $LY(f)_n$ respectively. The input and output loudness density functions $LX(f)_n$ and $LY(f)_n$ are thus representations of the loudness of the input and output signals in a perceptual frequency domain. In step 2.14 the input and output loudness density functions $LX(f)_n$ and $LY(f)_n$ are subtracted, resulting in a difference loudness density function $D(f)_n$ from which a perceived quality measure can be derived.

After asymmetrical processing in 2.15 between positive and negative bins in the difference loudness function $D(f)_n$, frequency integration in 2.16 and emphasizing silent parts in 2.17 the difference loudness density function $D(f)_n$ is transformed in an asymmetric disturbance measure DA, which can be used as a perceived quality measure. The same applies for steps 2.18 and 2.19 where the difference loudness density function $D(f)_n$ is transformed in a disturbance measure $D_n$, by frequency integration and emphasizing silent parts respectively but without asymmetry.

Then after aggregation over time frames in step 2.20 the disturbance measure D and the asymmetrical disturbance measure DA are combined to a single PESQ score denoting a perceptive quality estimate for the audio transmission system 1.

All steps 2.1 . . . 2.20 are described in more detail in [6] which is included by reference herein.

Figure 3:
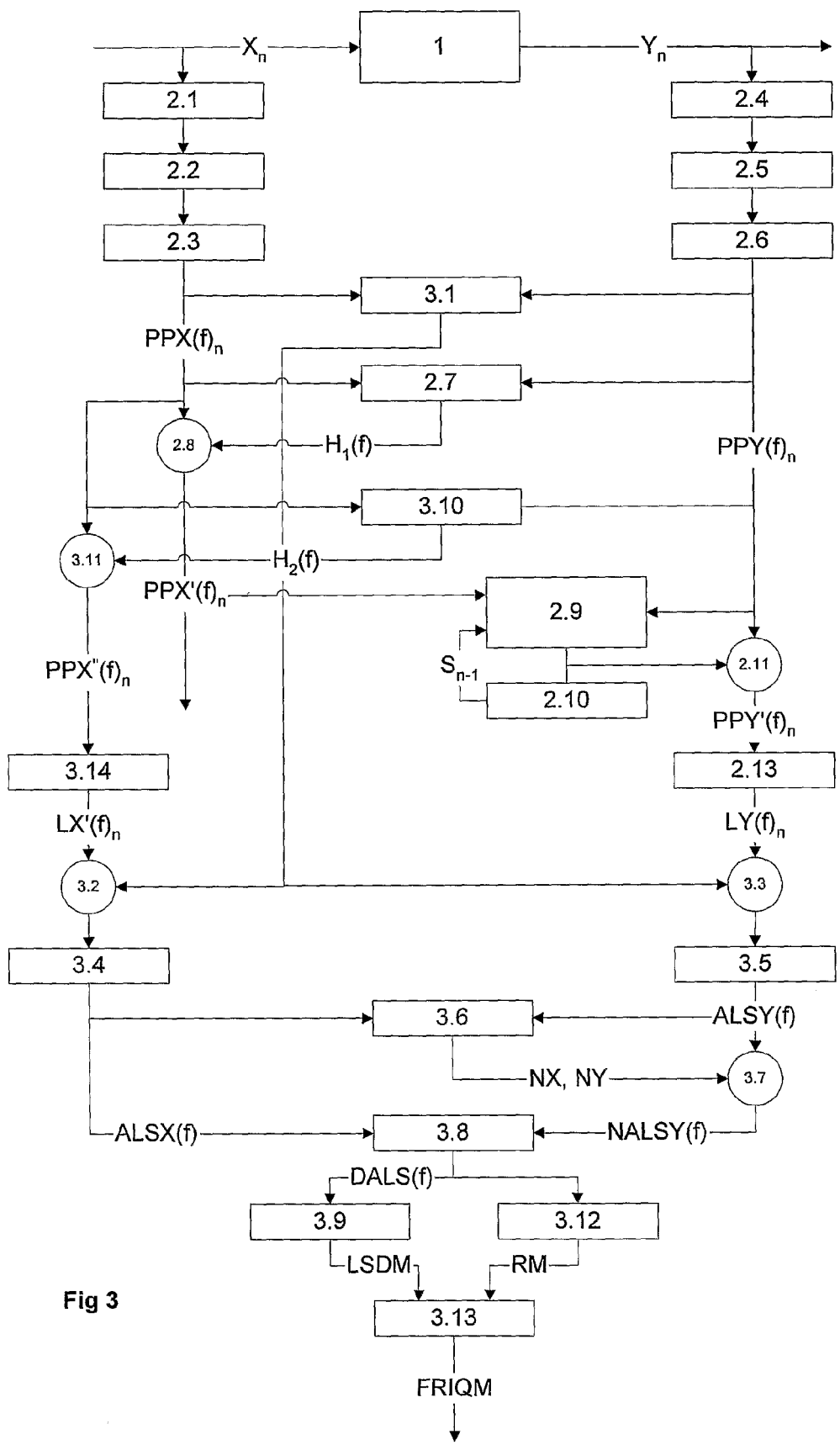
FIG. 3 shows a diagram representing a method for determining the perceived quality of an audio transmission system according to a preferred embodiment of the invention.

FIG. 3, discloses a method measuring the transmission quality of an audio transmission system according to the invention, wherein the known steps 2.1 . . . 2.11 are used to establish a frequency compensated input pitch power density function $PPX'(f)_n$ and wherein step 2.13 is used to establish a loudness density function $LY(f)_n$.

According to the invention, in step 2.7 a new first frequency compensating function $H_1(f)$ is calculated. $H_1(f)$, is a power based softscaling function with offset [6], using the in time averaged input and output pitch power density functions APPX(f) and APPY(f): $H_1(f)=(APPY(f)+OFFSET/APPX(f)+OFFSET)^{q(f)}$, with q(f) is in the range of 0.0-1.0 (can be frequency dependent), wherein OFFSET is in the range of $10^4$-$10^6$.

The smaller q and the higher the OFFSET, the smaller the amount of frequency compensation is achieved. The parameters q and OFFSET in this step 2.7 are to be tuned for optimum results.

Preferably q(f) is in the range of 0.5 and OFFSET is in the range of $4*10^5$. Like in P.862, a first frequency compensated input pitch power density function $PPX'(f)_n$ is calculated in 2.8 by multiplying the input pitch power density function $PPX(f)_n$ with the first frequency compensating function $H_1(f)$.

In step 3.10 a second frequency compensation function $H_2(f)$ is calculated similar to step 2.7 over the same set of speech active frames using a power based softscaling function with offset but now with a higher offset: $H_2(f)=(APPY(f)+OFFSETLARGE/APPX(f)+OFFSETLARGE)^{q(f)}$, wherein q(f) is in the range of 0.0-1.0 (can be frequency dependent), and OFFSETLARGE is in the range of $10^5$-$10^8$.

Preferably q(f) is in the range of 0.4 and OFFSETLARGE is in the range of $5*10^6$.

The secondary frequency compensation function $H_2(f)$ is used to multiply in step 3.11 the input pitch power density function $PPX(f)_n$, resulting in a secondary compensated pitch power density function $PPX''(f)_n$.

In an embodiment according to the invention, the primary and second frequency compensation functions $H_1(f)$ and $H_2(f)$ are not directly calculated from the APPX(f) and APPY(f) functions, but from a smoothed version of these functions.

The smoothing is carried out by averaging over the Bark bin values (f), f=0, . . . $f_{MAX}$ as specified in P.862 [3], where f=0 and $f_{MAX}$ represent the first and last bin values. The averaging is carried out over bins 0, 1 and $f_{MAX}$, $f_{MAX}-1$ respectively. For the second and second last (1 and $f_{MAX}-1$) the averaging is carried out over bins 0, 1, 2 and $f_{MAX}$, $f_{MAX}-1$, $f_{MAX}-2$ respectively. Next this averaging is repeated up to a lower index of 10 and down to a higher index of $f_{MAX}-4$. Between the indices 10 and $f_{MAX}-4$ the averaging is carried out over five bins, from two to the left upto two to the right of the index value.

In step 3.14, similar to step 2.12, the secondary compensated pitch power density function $PPX''(f)_n$ is transformed to an input loudness density function $LX'(P)_n$ containing less linear frequency response distortion compensations then used within the loudness calculation according to the invention. The parameters q(f) and OFFSETLARGE in this step 3.10, 3.11 are to be tuned for optimum results in a linear frequency distortion quality measure.

The new input loudness density function $LX'(f)_n$ and the P.862 alike output loudness density function $LY(f)_n$ are then used to calculate the averaged loudness density functions ALSX(f) and ALSY(f) by averaging in steps 3.4 and 3.5 the spectral loudness density functions $LX'(f)_n$ and $LY(f)_n$.

The averaging in time is according to Lebesque, $$ALSX(f) = \left(\frac{1}{n}\sum_n LX'(f)_n^p\right)^{\frac{1}{p}}$$

and $$ALSY(f) = \left(\frac{1}{n}\sum_n LY(f)_n^p\right)^{\frac{1}{p}}$$

with p>1, preferably p=2.5.

Optionally, this averaging is performed only over the time frames for which both the input and output power per frame are larger then a silence criterion value, preferably $PPX(f)_n$ and $PPY(f)_n > 10^7$, determined in step 3.1 and effected in steps 3.2 and 3.3.

These averaged input and output loudness density functions, representing the loudness as a function of frequency, are then power integrated in step 3.6 over the frequency axis (Lp=1) resulting in a single loudness number NX for the (idealized) reference and a loudness number NY for the adjusted distorted signal according to $$NX = \left(\int_f ALSX'(f)^p df\right)^{\frac{1}{p}}$$

and $$NY = \left(\int_f ALSY(f)^p df\right)^{\frac{1}{p}}.$$

These single loudness numbers NX, NY are then used to normalize the averaged loudness density function ALSY(f) in step 3.7 in such a way that the average of the averaged output loudness density function ALSY(f) in the frequency domain is the same for both the (idealized) input and adjusted output signal, resulting in a normalized averaged loudness density function NALSY(f).

In the step 3.8 a difference averaged loudness function DALS(f) is defined between the averaged loudness densities ALSX(f) and NALSY(f). In step 3.9, this difference averaged loudness function is then integrated over the frequency axis using again Lebesque but now over the individual frequency band differences using a p<1.0 (p preferably in the range of 0.2 to 0.4) for the loudness in each Bark frequency band. The result is a loudness frequency response distortion measure LSDM according to $$LSDM = \sum_f DALS(f)^p,$$

wherein f denotes a frequency band in the difference averaged loudness spectrum.

A special roughness measure RM can be calculated in step 3.12 by taking the absolute value of the consecutive loudness bins of the loudness difference function DALS(f) and summing them for all consecutive bins:

$$RM = \sum_f |DALS_f^p - DALS_{f-1}^p|,$$

(f being the band index number, with p in the range of 0.5-2.0 and preferably p is in the range of 1.5).

The roughness number RM can be combined in step 3.13 with the loudness frequency response distortion measure LSDM by means of multiplication, the result of which is mapped to a Mean Opinion Score table, resulting in a single frequency response impact quality measure FRIQM.

Figure 4:
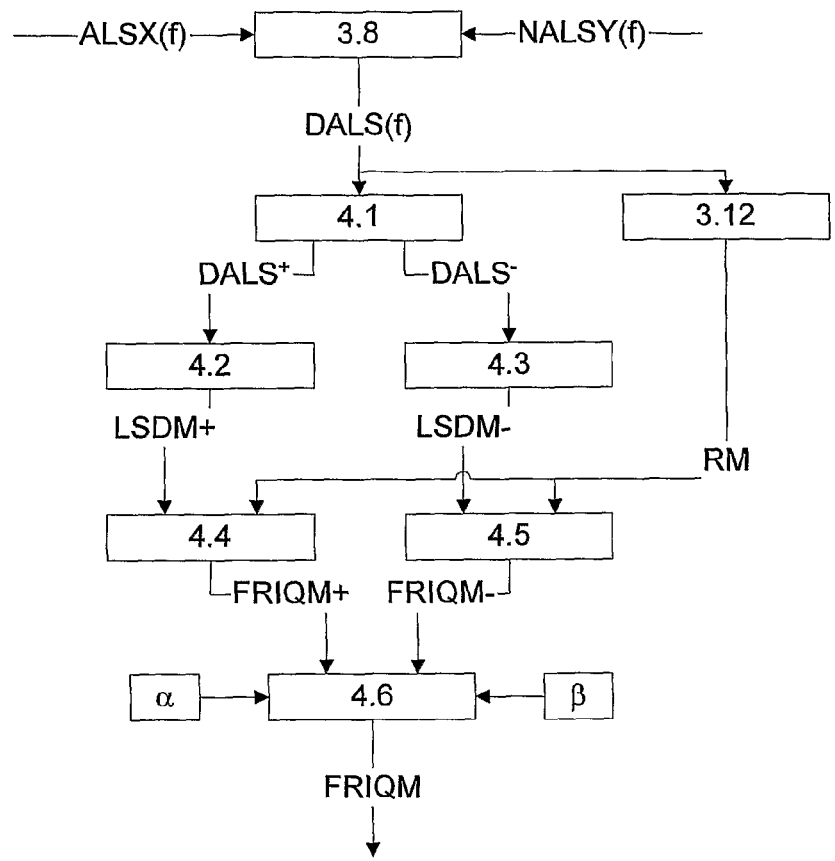
FIG. 4 shows an improvement according to a first embodiment of the invention
Figure 5:
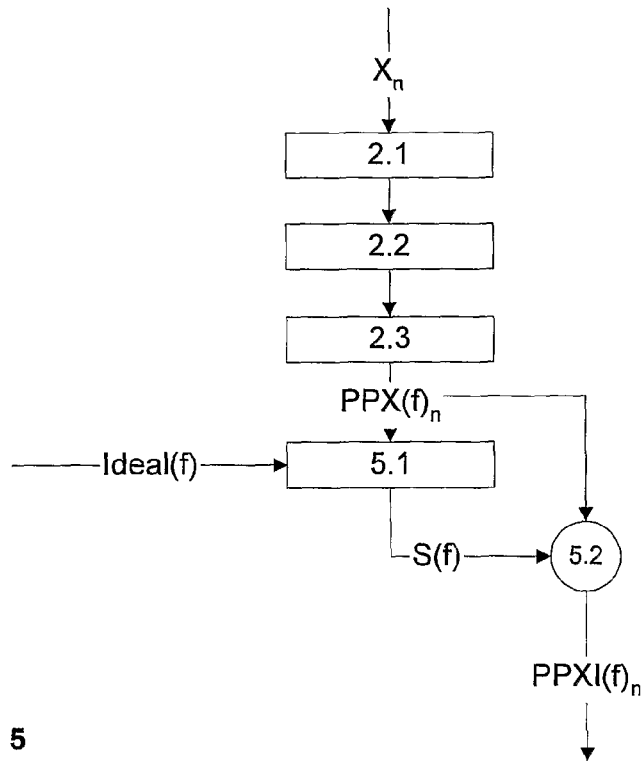
FIG. 5 shows a further improvement according to a second embodiment of the invention.

FIG. 4 shows an embodiment according to the invention wherein, in step 4.1, the difference function DALS(f) is split into a positive part (input>output) and a negative part DALS+ (f) and DALS−(f). In steps 4.2 and 4.3, both parts, DALS(f)+ and DALS(f)− respectively, are then integrated according to Lebesque over the frequency axis using again the Lp norm but now over the individual frequency band differences using a p<1.0 with 0.1≦p≦0.5 for the loudness in each Bark frequency band. This results in a positive and negative frequency response distortion number LSDM+ and LSDM−.

In steps 4.4 and 4.5, the two linear frequency domain impact numbers FRIQM+ and FRIQM− are calculated from the positive and negative frequency response distortion number LSDM+ and LSDM−, by multiplying with the roughness number RM. These frequency response distortion numbers are then mapped in step 4.6 to a MOS (Mean Opinion Score) like scale for quantifying the impact of the linear frequency response distortion yielding the two linear frequency domain impact numbers FRIQM+ and FRIQM− respectively. FRIQM+ and FRIQM− are weighed to obtain the single frequency response impact quality measure FRIQM: FMJQM=α*FRIQM$^+$+β*FRIQM$^-$, wherein preferably α+β=1, and wherein the ratio between α and β is preferably more than 10. In a current implementation β=0, so only LSDM+ values are taken into account.

The LSDM+ and LSDM− can of course also be combined in a fashion similar to the frequency response impact quality measures FRIQM+ and FRIQM−, after which a mapping to an MOS can occur to yield a single frequency response impact quality measure FRIQM. Furthermore the multiplication with the roughness measure can also be performed on LSDM alone in this embodiment.

According to a preferred embodiment of the invention as shown in FIG. 4, the input pitch power density function is frequency compensated, using Lebesque, on the basis of an Lp scaling with 0.3<p<0.6 towards an ideal spectral power density Ideal(f) of a speech signal. The input pitch power density function is calculated from the input reference speech signal by calculating the average power in each frequency Bark band over the complete speech fragment for which the quality of the distorted signal has to be calculated. The ideal spectral power density function Ideal(f) is defined on the basis of averaging of the long-term average spectral power density of many male and female voices which are recorded with a flat frequency response microphone. In each bark band as used in PESQ a density number is constructed on the basis of this ideal density function.

This partial scaling towards an ideal spectral power density function Ideal(f) compensates errors in the recording technique. Recording techniques often lead to unbalanced spectral power densities, in most cases an over-emphasis of the lower frequencies (below 500 Hz).

From the ideal and input spectrum smoothed versions of the ideal spectral power density function Ideal(f) and input pitch power density function PPX(f)$_n$ are calculated in step 5.1 by averaging over a number of consecutive frequency bands. From these smoothed versions compensation factors S(f) can be calculated for each bark band defined as the ratio of the powers "ideal/reference". These factors S(f) are then used to rescale in step 5.2 the input pitch power density function PPX(f)$_n$ with S(f)$^p$, with 0.3<p<0.8, to obtain an (idealized) input pitch power density function PPXI(f)$_n$ which can be used for further evaluation according to the invention instead of the input pitch power density function PPX(f)$_n$.

Note that the invention can be combined with the local time scaling using iteratively adjusting the frequency compensation and local time scaling according to [7].

The invention can be embodied in a computer system comprising a processor, memory and an input and an output. The input may be a reading device like an analog input capable of sampling a reference input signal and a degraded output signal coming from an audio transmission system under test. The sampled signals can be stored in a memory, for example a fixed disk, and put into frames, by selecting rows of samples. The processor can then proceed and perform the steps as described above. A result, for example the linear frequency impact quality measure can be output to a display, or to a communication port, or stored in the memory for future reference.

LITERATURE

[1] A. W. Rix, M. P. Hollier, A. P. Hekstra and J. G. Beerends, "*PESQ, the new ITU standard for objective measurement of perceived speech quality, Part 1—Time alignment,*" J. Audio Eng. Soc., vol. 50, pp. 755-764 (2002 October).

[2] J. G. Beerends, A. P. Hekstra, A. W. Rix and M. P. Hollier, "*PESQ, the new ITU standard for objective measurement of perceived speech quality, Part II—Perceptual model,*" J. Audio Eng. Soc., vol. 50, pp. 765-778 (2002 October) (equivalent to KPN Research publication 00-32228).

[3] ITU-T Rec. P.862, "Perceptual Evaluation Of Speech Quality (PESQ), An Objective Method for End-to-end Speech Quality Assessment of Narrowband Telephone Networks and Speech Codecs," International Telecommunication Union, Geneva, Switzerland (2001 February.).

[4] A. P. Hekstra, J. G. Beerends, "*Output power decompensation,*" International patent application; PCT EP02/

02342; European patent application 01200945.2, March 2001; Koninklijke PTT Nederland N.V.

[5] J. G. Beerends, "*Frequency dependent frequency compensation*," International patent application; PCT EP02/05556; European patent application 01203699.2, June 2001; Koninklijke PTT Nederland N.V.

[6] J. G. Beerends, "*Method and system for measuring a system's transmission quality,*" Softscaling, International patent application; PCT EP03/02058; European patent application 02075973.4-2218, April 2002, Koninklijke PTT Nederland N.V.

[7] J. G. Beerends, "*Method and system for measuring a system's transmission quality*"; European patent application 02075973, July 2003, Koninklijke PTT Nederland N.V.

[8] T. Goldstein, J. G. Beerends, H. Klaus and C. Schmidmer, "Draft ITU-T Recommendation P.AAM, An objective method for end-to-end speech quality assessment of narrow-band telephone networks including acoustic terminal(s)," White contribution COM 12-64 to ITU-T Study Group 12, September 2003.

The invention claimed is:

1. A method for operating a computer-based audio transmission system (1) having an input signal ($X_n$) and a time framed output signal ($Y_n$), the computer-based audio transmission system establishing a first frequency compensated input pitch power density function (PPX'(f)$_n$) of the time framed input signal ($X_n$), the method comprising the steps of:
   processing (2.1 ... 2.3) the input signal ($X_n$), to obtain an input pitch power density function (PPX(f)$_n$);
   processing (2.4 ... 2.6) the output signal ($Y_n$), to obtain an output pitch power density function (PPY(f)$_n$);
   frequency compensating (2.7, 2.8) the input pitch power density function (PPX(f)$_n$), with a first frequency compensating function ($H_1(f)$), to obtain the first frequency compensated input pitch power density function (PPX'(f)$_n$);
the method being characterized by
   the step of frequency compensating (2.7, 2.8) the input pitch power density function (PPX(f)$_n$) comprising a power based softscaling function with offset [6] using with a power in the range of 0.5, and an offset in the range of $4*10^5$.

2. The method of claim 1, further comprising the steps of:
   compensating the output pitch power density function (PPY(f)$_n$) for short term gain variations (2.9 ... 2.11), to obtain a locally scaled output pitch power density function (PPY'(f)$_n$);
   transforming (2.13) the frequency compensated output pitch power density function (PPY'(f)$_n$) to a loudness perception scale to obtain an output loudness density function (LY(f)$_n$);
   frequency compensating (3.10, 3.11) the input pitch power density function (PPX(f)$_n$), with a second frequency compensating function ($H_2(f)$), yielding a second frequency compensated input pitch power density function (PPX"(f)$_n$);
   transforming (3.14) the second frequency compensated input pitch power density function (PPX"(f)$_n$) to a loudness perception scale to obtain an input loudness density function (LX'(f)$_n$);
   averaging (3.4) over the time frames of the framed input loudness density function (LX'(f)$_n$) to obtain an averaged input loudness spectrum (ALSX(f));
   averaging (3.5) over the time frames of the framed output loudness density function (LY(f)$_n$) to obtain an averaged output loudness spectrum (ALSY(f));
   normalizing (3.6, 3.7) the averaged output loudness spectrum (ALSY(f)) with respect to the averaged input loudness spectrum (ALSX(f)), thereby obtaining a normalized averaged output loudness spectrum (NALSY(f));
   subtracting (3.8) the input loudness spectrum (ALSX(f)) from the normalized output loudness spectrum (NALSY (f)) thereby obtaining a difference averaged loudness spectrum (DALS(f));
   Lebesque integrating (3.9) the difference averaged loudness spectrum function (DALS(f)), thereby establishing a linear spectral distortion measure (LSDM) for the audio transmission system (1).

3. The method according to claim 2, further comprising the step of:
   establishing (3.12) a roughness measure (RM) of the difference averaged loudness spectrum (DALS(f)) based on the absolute difference of consecutive frequency bin values;
   combining (3.13) the roughness measure (RM) and the linear spectral distortion measure (LSDM) by multiplication and mapping the result to a MOS (Mean Opinion Score) scale (FRIQM).

4. The method according to claim 2, wherein the step of frequency compensating (3.10, 3.11) the input pitch power density function (PPX(f)$_n$), yielding a second frequency compensated input pitch power density function (PPX"(f)$_n$) is based on a power based softscaling function with offset [6] with a power in the range 0.4, and an offset in the range of $5*10^6$.

5. The method according to claim 4, wherein the second frequency compensation functions ($H_2(f)$) is expressed in terms of Bark bin values and is derived from averaging over at least two neighboring Bark bin values of the input and output pitch power density functions.

6. The method according to claim 2, wherein the second frequency compensation functions ($H_2(f)$) is expressed in terms of Bark bin values and is derived from averaging over at least two neighboring Bark bin values of the input and output pitch power density functions.

7. The method according to claim 2, wherein the step of establishing of a linear spectral distortion measure (LSDM) further comprises:
   splitting (4.1) the difference averaged loudness spectrum (DALS(f)) in a positive difference averaged loudness spectrum (DALS+(f)) and a negative difference averaged loudness spectrum (DALS-(f));
   integrating (4.2) in the frequency domain positive values of the difference averaged loudness spectrum (DALS+(f)), thereby establishing a positive linear spectral distortion measure (LSDM+);
   integrating (4.3) in the frequency domain negative values of the difference averaged loudness spectrum (DALS-(f)), thereby establishing a negative linear spectral distortion measure (LSDM-);
   multiplying (4.4) the roughness measure (RM) and the positive linear spectral distortion measure (LSDM+) and mapping the result to a MOS (Mean Opinion Score) scale, thereby obtaining a positive frequency response distortion quality measure (FRIQM+);
   combining (4.5) the roughness measure (RM) and the negative linear spectral distortion measure (LSDM-) by multiplication and mapping the result to a MOS (Mean Opinion Score) scale, thereby obtaining a negative frequency response distortion quality measure (FRIQM-);
   weighing (4.6) the positive frequency response distortion quality measure (FRIQM+) with a first weigh factor ($\alpha$) greater than 0;

weighing (4.6) the negative frequency response distortion quality measure (FRIQM−) with a second weigh factor (β) greater than 0;

adding (4.6) the weighed negative frequency response impact quality measure (FRIQM−) and the positive frequency response impact quality measure (FRIQM+) thereby obtaining a single frequency response impact measure (FRIQM).

8. The method according to claim 1, wherein the first frequency compensation functions ($H_1(f)$) is expressed in terms of Bark bin values and is derived from averaging over at least two neighboring Bark bin values of the input and output pitch power density functions.

9. The method according to claim 1, wherein the step of processing (2) the time framed input signal ($X_n$) further comprises the step of:

frequency compensating (5.1, 5.2) the input pitch power density function ($PPX(f)_n$) with respect to an ideal spectrum Ideal(f).

10. The method according to claim 1, the method further comprising the steps of:

detecting time frames (3.1) for which simultaneously the input and output pitch power density functions ($PPX(f)_n$, $PPY(f)_n$) per frame are larger then a silence criterion value;

gating (3.2 and 3.3) the input loudness density function frames ($LX'(f)_n$) and output loudness density function frames ($LY(f)_n$) under the control of the detecting of time frames (3.1).

11. The method according to claim 1, further comprising the steps of:

compensating the output pitch power density function ($PPY(f)_n$) for short term gain variations (2.9 ... 2.11), to obtain a locally scaled output pitch power density function ($PPY'(f)_n$);

transforming (2.12) the first frequency compensated input pitch power density function ($PPX'(f)_n$) to a loudness perception scale to obtain an input loudness density function ($LX(f)_n$);

transforming (2.13) the frequency compensated output pitch power density function ($PPY'(f)_n$) to a loudness perception scale to obtain an output loudness density function ($LY(f)_n$);

subtracting (3.4) output and input loudness density functions ($LY(f)_n$, $LX(f)_n$) to obtain an difference loudness density function ($D(f)_n$);

asymmetrical processing (2.15) between positive and negative bins in the difference loudness density function ($D(f)_n$), thereby obtaining an asymmetrical difference loudness density function ($DA(f)_n$);

frequency integrating (2.16) of the asymmetrical difference loudness density function ($DA(f)_n$), and emphasizing silent parts (2.17) thereby obtaining an asymmetrical disturbance measure ($DA_n$);

frequency integrating (2.18) of the difference loudness density function ($D(f)_n$), and emphasizing silent parts (2.19) thereby obtaining an symmetrical disturbance measure ($D_n$);

time integrating (2.20) the difference loudness density function and the asymmetrical difference loudness density function ($D_n$, $DA_n$), thus obtaining a symmetrical and a asymmetrical disturbance measure (D, DA) and then combining (2.20) the symmetrical and asymmetrical disturbance measures (D, DA), thereby obtaining a single perceptive quality estimate (PESQ).

12. The method according to claim 1, wherein the step of processing (2) the time framed input signal ($X_n$) further comprises the step of:

frequency compensating (5.1, 5.2) the input pitch power density function ($PPX(f)_n$) with respect to an ideal spectrum Ideal(f).

13. A computer-based processing system for operating an audio transmission system having an input and an output, the computer-based audio transmission system establishing a frequency compensated input pitch power density function of a time framed input signal the output of which yields a time framed output signal, comprising:

a computer-based processor;

means for inputting a framed input signal (Xn) and a framed output signal (Yn);

means for outputting a frequency response impact quality measure (LSDM, FRIQM, PESQ);

whereby the computer-based processor is arranged for executing the steps of the method according to claim 1.

14. A computer readable media having executable instructions for causing a processor to perform a method for operating a computer-based audio transmission system (1) having an input signal ($X_n$) and a time framed output signal ($Y_n$), the computer-based audio transmission system establishing a first frequency compensated input pitch power density function ($PPX'(f)_n$) of the time framed input signal ($X_n$), the method comprising the steps of:

processing (2.1 ... 2.3) the input signal ($X_n$), to obtain an input pitch power density function ($PPX(f)_n$);

processing (2.4 ... 2.6) the output signal ($Y_n$), to obtain an output pitch power density function ($PPY(f)_n$);

frequency compensating (2.7, 2.8) the input pitch power density function ($PPX(f)_n$), with a first frequency compensating function ($H_1(f)$), to obtain the first frequency compensated input pitch power density function ($PPX'(f)_n$);

the method being characterized by the step of frequency compensating (2.7, 2.8) the input pitch power density function ($PPX(f)_n$) comprising a power based softscaling function with offset [6] using with a power in the range of 0.5, and an offset in the range of $4*10^5$.

* * * * *